US010380903B2

(12) United States Patent
Robin et al.

(10) Patent No.: US 10,380,903 B2
(45) Date of Patent: Aug. 13, 2019

(54) COLLISION AVOIDANCE METHOD AND DEVICE FOR AN AIRCRAFT FORMATION RELATIVE TO AN INTRUSIVE AIRCRAFT

(71) Applicant: AIRBUS OPERATIONS (S.A.S.), Toulouse (FR)

(72) Inventors: Jean-luc Robin, Saint-Jean (FR); Camille Caruhel, Toulouse (FR); Sylvain Deplanche, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 63 days.

(21) Appl. No.: 15/445,506

(22) Filed: Feb. 28, 2017

(65) Prior Publication Data
US 2017/0309192 A1 Oct. 26, 2017

(30) Foreign Application Priority Data

Mar. 8, 2016 (FR) ...................................... 16 51927

(51) Int. Cl.
*G08G 5/04* (2006.01)
*G08G 5/00* (2006.01)
*G05D 1/10* (2006.01)

(52) U.S. Cl.
CPC ............ *G08G 5/045* (2013.01); *G05D 1/104* (2013.01); *G08G 5/0008* (2013.01); *G08G 5/0021* (2013.01); *G08G 5/0052* (2013.01)

(58) Field of Classification Search
CPC .... G08G 5/045; G08G 5/0021; G08G 5/0052; G08G 5/0008; G05D 1/104
USPC ........................................................ 701/1, 3
See application file for complete search history.

(56) References Cited

U.S. PATENT DOCUMENTS

| 6,271,768 B1 * | 8/2001 | Frazier, Jr. ........... G08G 5/0008 340/961 |
| 6,459,411 B2 * | 10/2002 | Frazier ................... G01C 23/00 340/961 |
| 6,483,454 B1 * | 11/2002 | Torre ...................... G01S 13/76 342/29 |

(Continued)

FOREIGN PATENT DOCUMENTS

WO    WO 00/41154 A1    7/2000
WO    WO 03/060855 A1   7/2003

OTHER PUBLICATIONS

French Search Report for Application No. 1651927 dated Dec. 8, 2016.

*Primary Examiner* — Jaime Figueroa
(74) *Attorney, Agent, or Firm* — Jenkins, Wilson, Taylor & Hunt, P.A.

(57) ABSTRACT

Collision avoidance method and device for an aircraft formation relative to an intrusive aircraft. The device manages a collision avoidance for an aircraft formation, relative to an aircraft external to the aircraft formation, the aircraft formation comprising a lead aircraft and at least one following aircraft, the device comprising a formation flight management unit with which all the aircraft of the aircraft formation are equipped and configured to manage the formation flight thereof, and management and control assemblies for determining and applying a coordinated avoidance maneuver intended for all the aircraft of the aircraft formation, this coordinated avoidance maneuver being determined so as to make it possible to avoid the collision with the intrusive aircraft while maintaining the formation flight.

16 Claims, 5 Drawing Sheets

(56) References Cited

U.S. PATENT DOCUMENTS

| | | | |
|---|---|---|---|
| 6,718,236 B1* | 4/2004 | Hammer | G08G 5/0008 342/36 |
| 8,229,604 B2* | 7/2012 | Villaume | G08G 5/0043 701/10 |
| 2002/0011950 A1* | 1/2002 | Frazier | G01C 23/00 342/357.32 |
| 2002/0063653 A1* | 5/2002 | Oey | G01S 13/765 342/29 |
| 2002/0080059 A1* | 6/2002 | Tran | G01S 13/9303 342/29 |
| 2002/0154061 A1* | 10/2002 | Frazier, Jr. | G01C 23/00 342/455 |
| 2003/0222795 A1* | 12/2003 | Holforty | B64D 43/00 340/968 |
| 2003/0236623 A1* | 12/2003 | Ybarra | G01S 13/9303 701/301 |
| 2005/0055143 A1* | 3/2005 | Doane | B64C 13/18 701/301 |
| 2005/0156777 A1* | 7/2005 | King | G01S 3/023 342/29 |
| 2005/0230563 A1* | 10/2005 | Corcoran, III | B64C 13/20 244/175 |
| 2007/0132638 A1* | 6/2007 | Frazier | G01S 13/765 342/455 |
| 2007/0268175 A1* | 11/2007 | Rowlan | G08G 5/0052 342/29 |
| 2007/0299611 A1* | 12/2007 | Winkler | G01C 23/005 701/301 |
| 2008/0103647 A1 | 5/2008 | Lucas et al. | |
| 2009/0088972 A1* | 4/2009 | Bushnell | G01C 23/005 701/414 |
| 2010/0292871 A1* | 11/2010 | Schultz | G01C 21/00 701/3 |
| 2011/0137498 A1* | 6/2011 | Suzuki | B64C 39/024 701/4 |
| 2011/0282582 A1* | 11/2011 | Stayton | G08G 5/0008 701/301 |
| 2012/0209457 A1* | 8/2012 | Bushnell | G01C 21/00 701/13 |
| 2013/0261949 A1 | 10/2013 | Eriksson | |
| 2014/0214243 A1* | 7/2014 | Whitehead | G05D 1/104 701/3 |
| 2016/0272340 A1* | 9/2016 | Leland | B64D 43/02 |
| 2017/0178516 A1* | 6/2017 | Shenfeld | G08G 5/0008 |
| 2017/0267371 A1* | 9/2017 | Frolov | B64D 43/02 |

* cited by examiner

COLLISION AVOIDANCE METHOD AND DEVICE FOR AN AIRCRAFT FORMATION RELATIVE TO AN INTRUSIVE AIRCRAFT

CROSS-REFERENCE TO RELATED APPLICATION

This patent application claims the benefit of and priority to French patent application number 16 51927, filed on Mar. 8, 2016, the entire disclosure of which is incorporated by reference herein.

TECHNICAL FIELD

The present disclosure relates to collision avoidance methods and devices for an aircraft formation relative to an intrusive aircraft.

BACKGROUND

In the context of the present disclosure:

an intrusive aircraft should be understood to be an aircraft not forming part of the formation and risking entering into collision with at least one aircraft of the formation, if no avoidance maneuver is implemented; and a formation flight is considered to comprise at least two aircraft, notably transport airplanes, namely a followed aircraft, called lead aircraft, and one or more following aircraft. The following aircraft fly by following the aircraft that they follow directly (namely the lead aircraft or another following aircraft) so as to maintain a constant spacing between them.

In a preferred application, in particular in cruising flight, the aircraft fly one behind the other at the same flight level, with the same heading and with the same speed. It is also possible to provide for speed control commands to be applied to the following aircraft such that they make it possible for the following aircraft to have the same position, the same speed, and the same acceleration as the followed aircraft had, in given prior periods.

Such a formation flight offers advantages particularly in terms of fuel consumption. In effect, the formation is generally defined, notably in terms of separation distance, such that a following aircraft is not disturbed by the vortexes created by the aircraft, in particular the lead aircraft preceding it in the formation.

Now, during such a formation flight, an aircraft external to the formation may happen to converge toward at least one of the aircraft of the formation so as to create a risk of collision necessitating the implementation of a separation maneuver.

Airliners are equipped with anti-collision systems of TCAS (Traffic Collision Avoidance Systems) type which make it possible to ensure air traffic safety by preventing the risks of in-flight collision. Thus, when two aircraft converge toward one another, their anti-collision systems compute an estimation of the collision time and transmit an alert informing the crews of each aircraft of a possible future collision: such an alert is generally called "traffic alert" or "TA alert". If necessary, the anti-collision systems also transmit, for the attention of the crew, a command for an avoidance maneuver in the vertical plane in order to exit from the situation of possibility of collision: such an avoidance maneuver command is generally called "resolution alert" or "RA alert". The TA and RA alerts are embodied by voice messages and by the display of information in the cockpits.

Such a separation maneuver generally consists in or comprises or comprises implementing a vertical separation between the aircraft concerned, generally of 700 feet for airliners.

Now, such a maneuver generating a modification of altitude of at least one of the aircraft of the formation will break the formation, such that the aircraft can no longer benefit from the above-mentioned advantages of the formation flight in such a situation.

Such standard management of the formation flight upon a risk of collision is not therefore satisfactory.

SUMMARY

An object of the present disclosure is to remedy this drawback. The disclosure herein relates to a collision avoidance method for an aircraft formation, relative to at least one aircraft external to the aircraft formation, called intrusive aircraft, the aircraft formation comprising a lead aircraft and at least one following aircraft, the method comprising a formation flight management method implemented on all the aircraft of the aircraft formation and consisting in or comprising managing a formation flight thereof.

According to the disclosure herein, the collision avoidance method comprises a first series of steps comprising:

a first reception step, implemented by a first data reception unit and consisting in or comprising receiving, for at least one aircraft of the aircraft formation, information on risk of collision with the intrusive aircraft;

a first decision step, implemented by a first decision unit and consisting in or comprising making an avoidance decision upon the reception of collision risk information concerning at least one aircraft of the aircraft formation, this first decision step consisting in or comprising generating an avoidance decision comprising a coordinated avoidance maneuver intended for all the aircraft of the aircraft formation, the coordinated avoidance maneuver being determined to avoid the collision with the intrusive aircraft while maintaining the formation flight when it is applied to all the aircraft of the aircraft formation; and a first transmission step, implemented by a first data transmission unit and consisting in or comprising transmitting the avoidance decision comprising the coordinated avoidance maneuver, to the aircraft of the aircraft formation.

Advantageously, the first series of steps is implemented on the lead aircraft.

Thus, by virtue of the present disclosure, the formation can be maintained upon the approach of an intrusive aircraft, by implementing a coordinated avoidance maneuver of the various aircraft of the formation. This makes it possible to remedy the abovementioned drawback and thus conserve the corresponding advantages, notably in terms of cost, of the formation flight.

Advantageously:

the information on the risk of collision with the intrusive aircraft is generated by a collision risk detection method capable of being implemented on at least one of the aircraft of the aircraft formation; and/or the first decision step comprises a step of implementation of a predetermined avoidance logic.

In a first embodiment, the first series of steps also comprises:

a second reception step, implemented by the first data reception unit and consisting in or comprising receiving agreement/disagreement information from the at least one following aircraft; and a second transmission step, implemented by the first data transmission unit and consisting in or comprising, in case of reception of agreement information, transmitting a command to trigger the coordinated avoidance maneuver to the at least one following aircraft for it to implement this coordinated avoidance maneuver.

In this first embodiment, the first series of steps comprises a first application step implemented by a first application unit and consisting in or comprising applying to the lead aircraft a specific avoidance logic, in case of reception of disagreement information.

Furthermore, in a second embodiment, the first transmission step consists in or comprises or comprises also transmitting a command to trigger the coordinated avoidance maneuver to the at least one following aircraft for it to implement the coordinated avoidance maneuver.

Moreover, advantageously, the method comprises a second series of steps, implemented on the at least one following aircraft of the aircraft formation and comprising:

a third reception step, implemented by a second data reception unit and consisting in or comprising receiving the coordinated avoidance maneuver;

a second decision step, implemented by a second decision unit and consisting in or comprising generating agreement/disagreement information concerning the coordinated avoidance maneuver; and a third transmission step, implemented by a second data transmission unit and consisting in or comprising transmitting the agreement/disagreement information to the lead aircraft.

Advantageously, the second series of steps comprises, in case of generation of disagreement information, a second application step implemented by a second application unit and consisting in or comprising applying to the following aircraft a specific avoidance logic.

Furthermore, advantageously, the second series of steps comprises, in case of generation of agreement information:

a fourth reception step, implemented by the second data reception unit and consisting in or comprising receiving a command to activate a coordinated avoidance maneuver; and a third application step, implemented by the second application unit and consisting in or comprising applying the coordinated avoidance maneuver to the following aircraft.

In addition, in the case of an aircraft formation comprising a plurality of following aircraft, the second series of steps is implemented on each of the following aircraft of the aircraft formation.

The collision avoidance method also comprises a verification step implemented by a verification unit and consisting in or comprising verifying that the aircraft forming part of the aircraft formation are flying in formation.

The present disclosure relates also to a collision avoidance device for an aircraft formation, relative to at least one aircraft external to the aircraft formation, called intrusive aircraft, the aircraft formation comprising a lead aircraft and at least one following aircraft, the collision avoidance device comprising a formation flight management unit with which all the aircraft of the aircraft formation are equipped and configured to manage a formation flight thereof.

According to the disclosure herein, the collision avoidance device comprises a management assembly comprising:

a first data reception unit configured to receive, for at least one aircraft of the aircraft formation, information on a risk of collision with the intrusive aircraft;

a first decision unit configured to make an avoidance decision upon the reception of collision risk information concerning at least one aircraft of the aircraft formation, the first decision unit being configured to generate an avoidance decision comprising a coordinated avoidance maneuver intended for all the aircraft of the aircraft formation, the coordinated avoidance maneuver being determined so as to avoid the collision with the intrusive aircraft while maintaining the formation flight when it is applied to all the aircraft of the aircraft formation; and a first data transmission unit configured to transmit the avoidance decision comprising the coordinated avoidance maneuver, to the aircraft of the aircraft formation.

In one embodiment:

the first data reception unit is configured to receive agreement/disagreement information from the at least one following aircraft; and the first data transmission unit is configured to, in case of reception of agreement information, transmit a command triggering the coordinated avoidance maneuver to the at least one following aircraft for it to implement this coordinated avoidance maneuver.

Furthermore, advantageously, the collision avoidance device comprises at least one control assembly mounted on at least one of the following aircraft of the aircraft formation and comprising:

a second data reception unit configured to receive the coordinated avoidance maneuver;

a second decision unit configured to generate agreement/disagreement information concerning the coordinated avoidance maneuver; and a second data transmission unit configured to transmit the agreement/disagreement information to the lead aircraft.

The present disclosure further relates to an anti-collision system of TCAS type, which comprises at least a part of such a collision avoidance device.

The present disclosure also relates to an aircraft, in particular a transport airplane, which is provided with a collision avoidance device and/or an anti-collision system such as those described above.

BRIEF DESCRIPTION OF THE DRAWINGS

The attached figures will give a clear understanding of how the disclosure herein can be produced. In these figures, identical references designate similar elements. More particularly.

DETAILED DESCRIPTION

Figure 1:
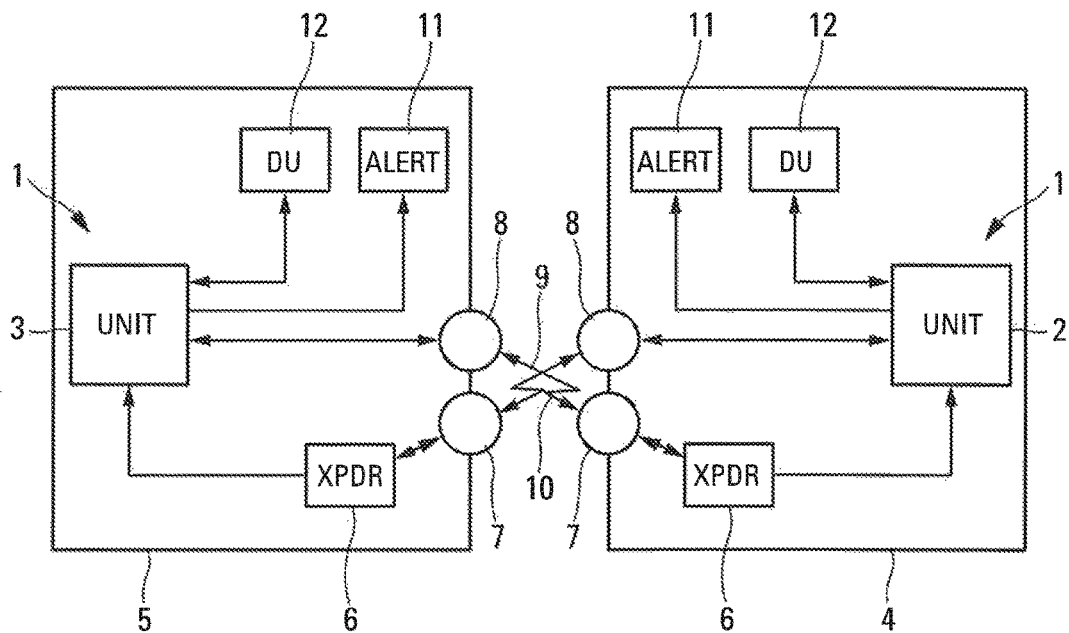
FIG. 1 is a block diagram of an embodiment of a collision avoidance device according to the disclosure herein.
Figure 2:
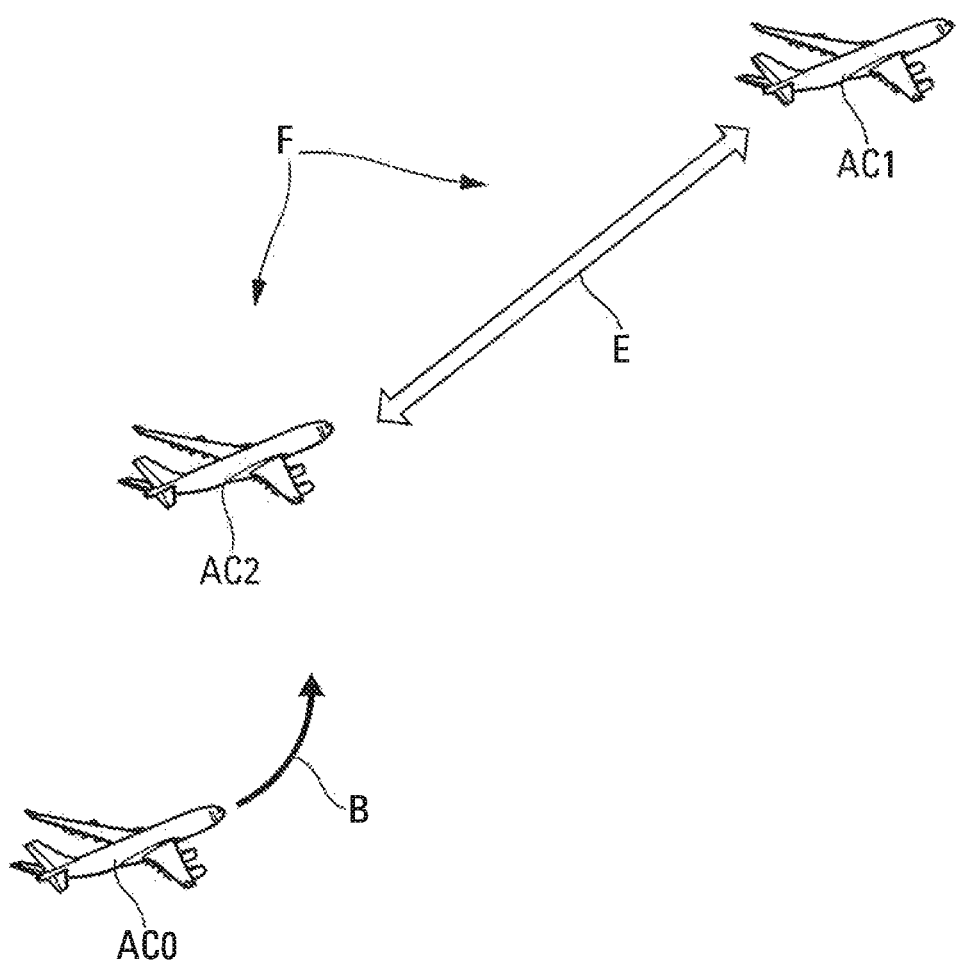
FIG. 2 is a schematic representation of an aircraft formation exhibiting a risk of collision with an intrusive aircraft.

Device 1 is schematically represented in FIG. 1 as a collision avoidance device for a formation F of aircraft AC1, AC2, in particular a formation of transport airplanes, relative to at least an aircraft AC0 external to the formation F, called intrusive aircraft, as represented in FIG. 2.

The formation F comprises a lead aircraft AC1 and one or more following aircraft, namely a single following aircraft AC2 in the example of FIG. 2, following the lead aircraft AC1 according to a spacing E.

An object of the device 1 is to avoid a collision with the intrusive aircraft AC0, that is to say with an aircraft not forming part of the formation F and risking entering into collision with at least one aircraft AC2 of the formation F as illustrated by an arrow B, if no avoidance maneuver is implemented.

The collision avoidance device 1 comprises formation flight management units (not specifically represented). Each of the aircraft of the aircraft formation is equipped with such a unit and it is configured to manage the formation flight thereof. The formation flight is such that the following aircraft fly by following the aircraft that they are directly following (namely the lead aircraft or another following aircraft) so as to maintain a constant spacing E between them, as represented in FIG. 2. In a preferred application, in particular in cruising flight, the aircraft AC1 and AC2 fly one behind the other at the same flight level, with the same heading and the same speed.

The collision avoidance device 1 comprises a first management assembly 2 (UNIT, short for "Management Unit") which is mounted on the lead aircraft, and one or more second control assemblies 3 (UNIT, short for "Management Unit") intended for the following aircraft. In the case of a plurality of following aircraft, each of the following aircraft is provided with one such control assembly 3.

Each of the assemblies 2 and 3 forms part of an embedded system 4, 5, preferably an anti-collision system specified hereinbelow.

Each of the systems 4 and 5 also comprises, as represented in FIG. 1:
a transponder 6 (XPDR) linked to a transponder antenna 7;
an antenna 8 of TCAS (Traffic Collision Avoidance System) type, the cross-communications (by electromagnetic waves) between the antennas 7 and 8 respectively of the two systems 5 and 6 are illustrated by arrows 9 and 10;
a standard alert unit 11 (ALERT), of sound and/or visual type; and
a display unit 12 (DU).

These various elements are linked to the corresponding assembly 2, 3 as represented in FIG. 1, in the system 4, 5.

Preferably, each of the systems 4 and 5 is therefore an anti-collision system of TCAS type. This anti-collision system makes it possible to ensure air traffic safety by preventing the risks of in-flight collision. Thus, when two aircraft converge toward one another, their anti-collision systems compute an estimation of the collision time and transmit (via the alert unit 11) an alert informing the crews of each aircraft of a possible future collision: such an alert is generally called "traffic alert" or "TA alert". If necessary, the anti-collision systems 4 and 5 also transmit, for the attention of the crew a command for an avoidance manoeuver in the vertical plane (for example via the display unit 12) in order to exit from the situation of possibility of collision: such an avoidance manoeuver command is generally called "resolution alert" or "RA alert". The TA and RA alerts are embodied by voice messages (via the alert unit 11) and by the display of information (via the display unit 12) in the cockpit. In practice, the embedded anti-collision system 4, 5 generally computes a time of collision in the horizontal plane (ratio between the horizontal distance of the two aircraft and their relative horizontal speed) and a time of collision in the vertical plane (ratio between the vertical distance of the two aircraft and their relative vertical speed). The duly calculated times of collision are compared to predetermined thresholds for the TA alerts and for the RA alerts (the predetermined thresholds being also a function of the altitude), and the alerts are triggered when the computed times of collision are below the corresponding predetermined thresholds.

Concerning the risk of collision, the TCAS systems transmit information via the transponder 6 and its antenna 7, and receive information via the antenna 8.

Figure 3:
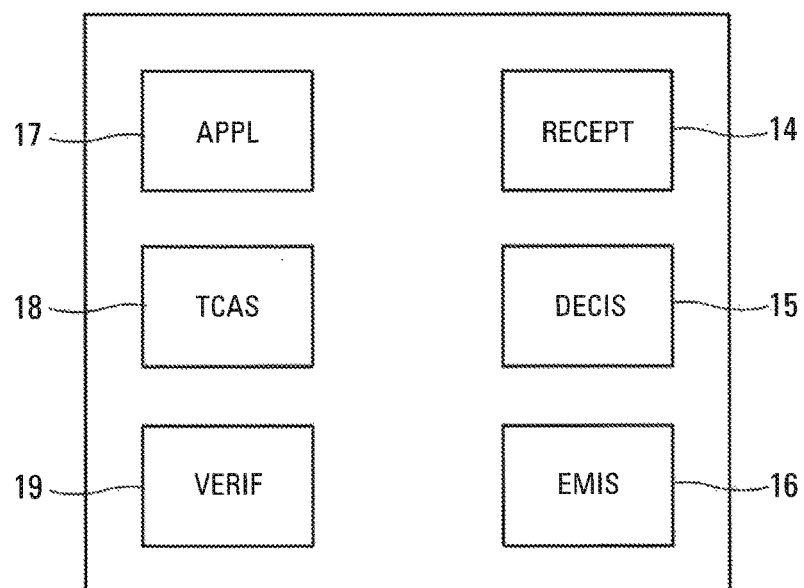
FIG. 3 is a block diagram of a particular embodiment of a management assembly intended for a lead aircraft.

Moreover, as represented in FIG. 3, the management assembly 2 notably comprises:
a data reception unit 14 (RECEPT);
a decision unit 15 (DECIS); and
a data transmission unit 16 (EMIS).

The units 14 and 15 are standard transceiver units capable of transmitting and receiving information via antennas, notably the antenna 8 (TCAS).

Figure 4:
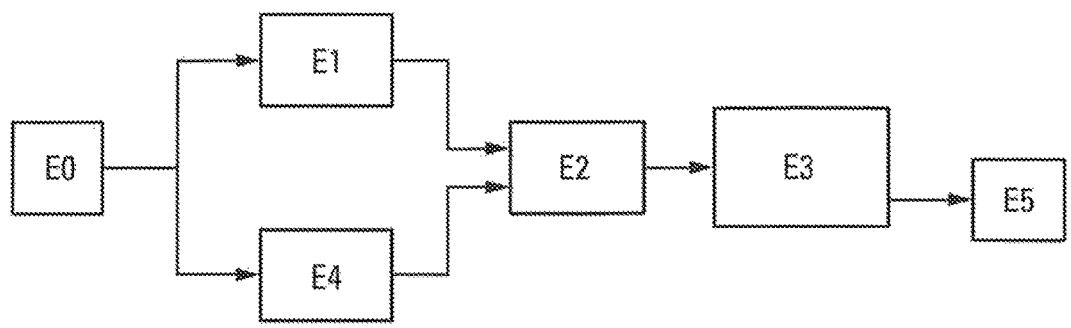
FIGS. 4 and 5 are block diagrams of successive steps of a method implemented by the management assembly of FIG. 3.

According to the disclosure herein, the management assembly 2 which is embedded on the lead aircraft AC1 (FIG. 2), implements a first series of the following steps, comprising, as represented in FIG. 4:
a reception step E1, implemented by the data reception unit 14 and consisting in or comprising receiving, if necessary, from at least one aircraft AC2 of the formation F, information on a risk of collision with the intrusive aircraft AC0;
a decision step E2, implemented by the decision unit 15 and consisting in or comprising making an avoidance decision upon the reception of collision risk information concerning at least one aircraft AC2 of the formation F. The decision step E2 consists in or comprises or comprises generating an avoidance decision comprising a coordinated avoidance manoeuver intended for all the aircraft AC1 and AC2 of the formation F; and
a transmission step E3, implemented by the data transmission unit 16 and consisting in or comprising transmitting the avoidance decision comprising the coordinated avoidance manoeuver, to the other aircraft AC1 of the formation F, via TCAS/XPDR messages.

According to the disclosure herein, the coordinated avoidance manoeuver is determined so as to make it possible to avoid the collision with the intrusive aircraft AC0 while maintaining the formation flight, when it is applied to all the aircraft AC1 and AC2 of the formation F.

Thus, by virtue of the device 1, the formation F can be maintained upon the approach of an intrusive aircraft AC0, by implementing a coordinated avoidance manoeuver of the different aircraft AC1 and AC2 of the formation F, as specified hereinbelow with reference to FIG. 9. This makes it possible to retain the corresponding advantages, notably in terms of (formation) flight cost.

Figure 5:
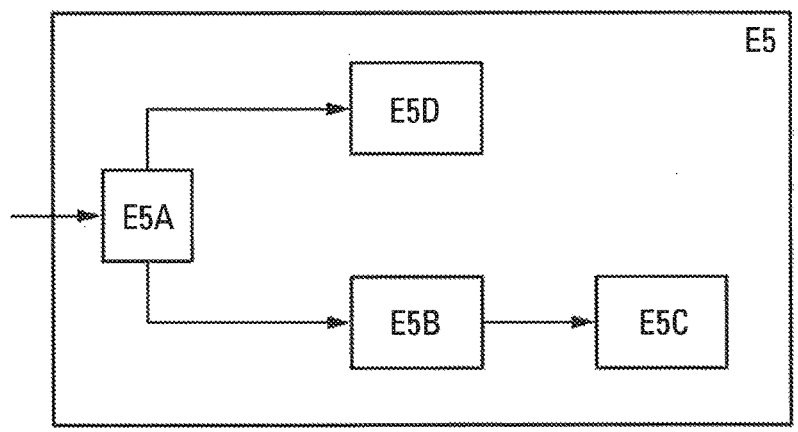

In a first particular embodiment, the management assembly 2 implements, in addition, a series E5 of substeps. This series E5 comprises, as represented in FIG. 5:
an agreement/disagreement information reception substep E5A, implemented by the data reception unit 14 and consisting in or comprising receiving agreement or disagreement information from the at least one following aircraft AC2; and
a data transmission substep E5B, implemented by the data transmission unit 16 and consisting in or comprising, in case of reception of agreement information in the substep E5A, transmitting a command to trigger the coordinated avoidance manoeuver to the at least one following aircraft AC2 for it to implement this coordinated avoidance maneuver.

In this case, the management assembly 2 also implements, when the conflict is definitively resolved, a substep E5C consisting in or comprising transmitting via the data transmission unit 16 conflict resolution information to all the following aircraft AC2 of the formation F.

Agreement information indicates that the following aircraft which has transmitted it is in agreement with the proposed avoidance manoeuver and is able to implement it. Otherwise, it transmits disagreement information.

In the case of a plurality of following aircraft, it is considered that the lead aircraft has received agreement information and can implement the substep E5B if all of the following aircraft have all transmitted agreement information. If that is not the case, the lead aircraft is considered to have received disagreement information.

In the first embodiment, the management assembly 2 implements, in case of reception of disagreement information in the substep E5A, in place of the substep E5B, an avoidance application substep E5D via a command application unit 17 (APPL) represented in FIG. 3.

The substep E5D consists in or comprises applying to the lead aircraft a specific avoidance logic, in case of reception of disagreement information in the substep E5A.

The unit 17 generates commands intended to be used by manual or automatic piloting of the aircraft to implement the avoidance. The automatic piloting can comprise a display unit, for example the display unit 12, for displaying commands to the pilots who manually perform the piloting. It can also be an automatic piloting system which automatically implements the avoidance.

In this case, the management assembly 2 also implements a step E4 of computation of the avoidance manoeuver specific to the lead aircraft in the case of a risk of conflict. This avoidance manoeuver is computed by a module 18 of the TCAS system which is, for example, incorporated in the management assembly 2 as represented in FIG. 3.

In this case, the decision step E2 takes into account the information generated in the two steps E1 and E4.

The first series of steps also comprises a verification step E0 implemented by a verification unit 19 (VERIF) and consisting in or comprising verifying, before the implementation of the step E1, that the aircraft forming part of the aircraft formation are flying in formation.

To perform this verification, the verification unit 19 takes into account, for example and in a nonlimiting manner, criteria of distance and of heading of the different aircraft of the formation.

Figure 6:
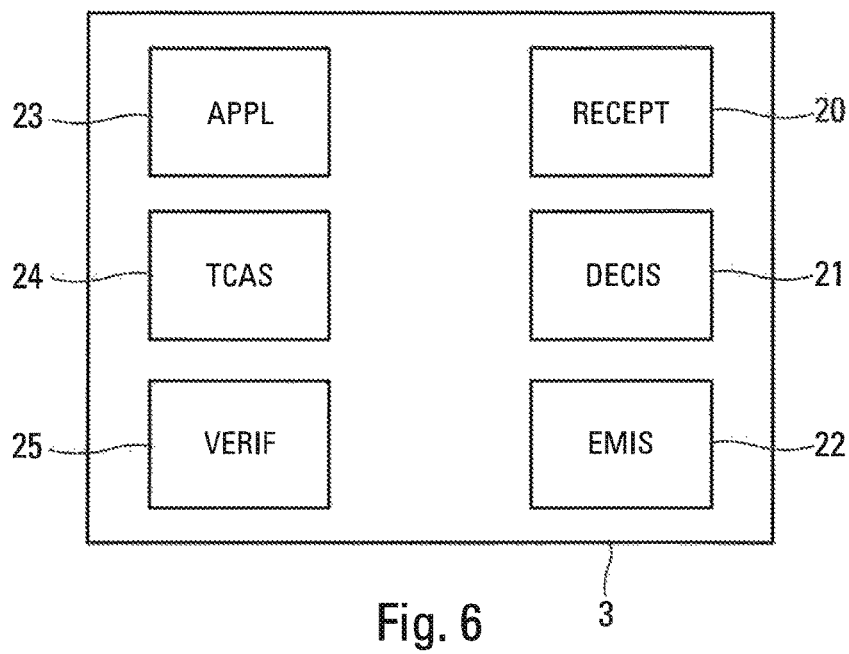
FIG. 6 is block diagram of a particular embodiment of a control assembly intended for a following aircraft.

Moreover, as indicated above, the collision avoidance device 1 also comprises a control assembly 3 which is mounted on each of the following aircraft of the formation F. This control assembly 3 comprises, as represented in FIG. 6:
a data reception unit 20;
a decision unit 21;
a data transmission unit 22;
a command application unit 23;
a TCAS-type module 24; and
a verification unit 25.

The units and module 20 and 22 to 25 are similar to the units and module 14 and 16 to 19 and are not described further.

Figure 7:
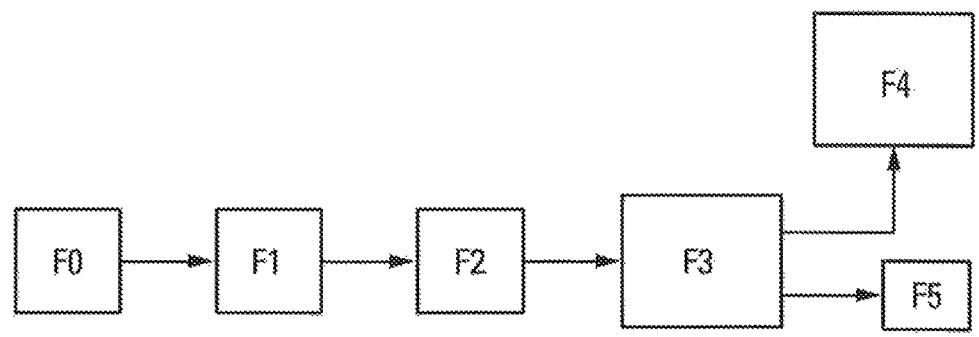
FIGS. 7 and 8 are block diagrams of successive steps of a method implemented by the control assembly of FIG. 6.

The control assembly 3 which is embedded on the following aircraft, implements a second series of subsequent steps, comprising, as represented in FIG. 7:

a reception step F1, implemented by the data reception unit 20 and consisting in or comprising receiving the coordinated avoidance manoeuver (determined and transmitted by the lead aircraft);

a decision step F2, implemented by the decision unit 21 and consisting in or comprising generating agreement/disagreement information concerning the coordinated avoidance manoeuver; and a transmission step F3, implemented by the data transmission unit 22 and consisting in or comprising transmitting the agreement/disagreement information to the lead aircraft.

In case of generation of disagreement information, the second series of steps comprises an application step F4 implemented by the application unit 23 and consisting in or comprising applying to the following aircraft a specific avoidance logic.

Figure 8:
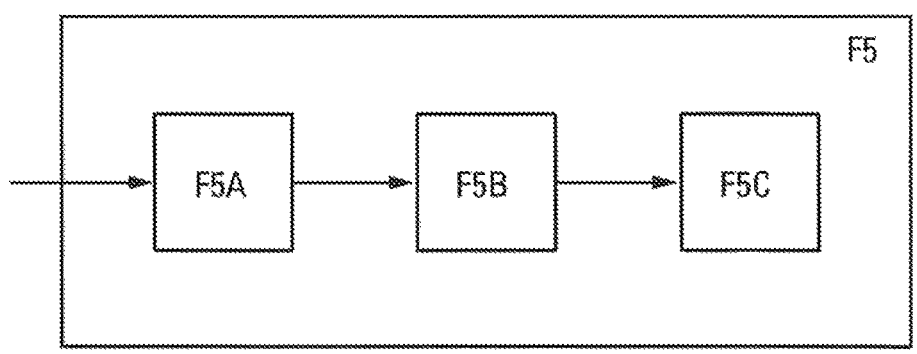
Figure 9:
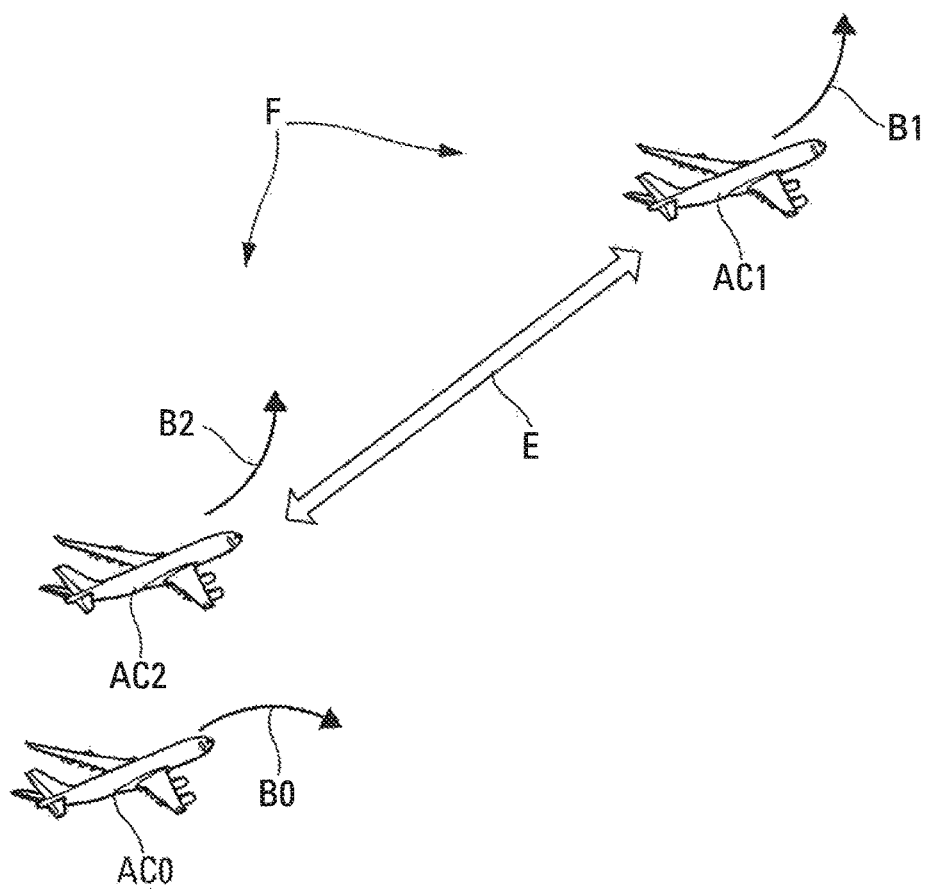
FIG. 9 is a representation similar to that of FIG. 2, with the risk of collision being resolved.

Furthermore, in case of generation of agreement information, the second series of steps implements a series F5 of substeps comprising, as represented in FIG. 8:

an activation reception substep F5A, implemented by the data reception unit 20 and consisting in or comprising receiving, if necessary, a command to activate the coordinated avoidance manoeuver (determined and transmitted by the lead aircraft); and an application substep F5B, implemented by the command application unit 23 and consisting in or comprising applying the coordinated avoidance manoeuver to the following aircraft AC2 (FIG. 9).

In this case, the control assembly 3 also implements a substep F5C consisting in or comprising receiving, via the data reception unit 20, conflict resolution information, transmitted by the lead aircraft when the conflict is resolved.

The second series of steps also comprises a verification step F0 (similar to the step E0 described above), implemented by the verification unit 24 and consisting in or comprising verifying that the aircraft forming part of the aircraft formation are flying in formation.

The decision unit 15 of the management assembly 2 generates the avoidance decision by taking account of data on the intrusive aircraft, on the roles of the aircraft in the formation, and on the availability of embedded means.

To do this, the decision unit 15 implements a predetermined avoidance logic, presented for example on a decision table. This decision table is adapted to the number of aircraft of the formation.

By way of illustration, the decision table can comprise the following avoidance decisions, in the case of a formation with two aircraft AC1 and AC2, comprising a lead aircraft AC1 and a following aircraft AC2 (as represented in FIGS. 1 and 9), as a function of the vertical and horizontal positions of the intrusive aircraft AC0 and of the current movements (climb, descent) of the aircraft AC0, AC1 and AC2:

A/ if the following aircraft with which there is a risk of collision is climbing, and if the intrusive aircraft is located below and behind the following aircraft and it is descending, then the following aircraft and the lead aircraft climb;

B/ if the following aircraft with which there is a risk of collision is descending, and if the intrusive aircraft is located above and behind the following aircraft and it is climbing, then the following aircraft and the lead aircraft descend;

C/ if the lead aircraft with which there is a risk of collision is climbing, and if the intrusive aircraft is located below and in front of the lead aircraft and it is descending, then the following aircraft and the lead aircraft climb;

D/ if the lead aircraft with which there is a risk of collision is descending, and if the intrusive aircraft is located above and in front of the following aircraft and it is climbing, then the following aircraft and the lead aircraft descend;

E/ if the following aircraft with which there is a risk of collision is climbing, and if the intrusive aircraft is located at the same flight level as the following aircraft and behind the following aircraft and is descending, then the following aircraft and the lead aircraft climb;

F/ if the following aircraft with which there is a risk of collision is descending, and if the intrusive aircraft is located at the same flight level as the following aircraft and behind the following aircraft and it is climbing, then the following aircraft and the lead aircraft descend;

G/ if the lead aircraft with which there is a risk of collision is descending, and if the intrusive aircraft is located at the same flight level as the lead aircraft and in front of the lead aircraft and it is climbing, then the following aircraft and the lead aircraft descend;

H/ if the lead aircraft with which there is a risk of collision is climbing, and if the intrusive aircraft is located at the same flight level as the lead aircraft and in front of the lead aircraft and it is descending, then the following aircraft and the lead aircraft climb; and I/ if all the aircraft are located at the same flight level and the intrusive aircraft is arriving from the right or from the left, the formation is broken, and the aircraft of the formation each follow the commands of their anti-collision system.

By way of illustration, in the example of FIGS. 2 and 9:

initially, as represented in FIG. 2, the intrusive aircraft AC0 is flying behind and below the following aircraft AC2 of the formation F, and it is climbing as illustrated by the arrow B;

the TCAS system of the following aircraft AC1 detects a risk of collision;

the device 1 implements the abovementioned steps to produce a resolution of the conflict with the formation maintained if possible;

consequently, to resolve this conflict, the aircraft AC1 and AC2 of the formation F climb in a coordinated manner, as illustrated respectively by the arrows B1 and B2 in FIG. 7, and the intrusive aircraft AC0 descends as illustrated by an arrow B0.

Thus, the risk of collision (or conflict) is rapidly lifted, and the formation F is not broken.

The device 1, as described above, thus offers in particular the following advantages:

it makes it possible, by a coordinated avoidance manoeuver, to maintain the formation upon a risk of collision with an intrusive aircraft, which makes it possible to conserve the advantages of such a formation, and in particular a reduced consumption of the following aircraft while minimizing the separation distance;

the operators on the ground can, after the conflict, continue to manage the flight of a formation and of an aircraft (intrusive aircraft), instead of having to separately manage the flights of all the aircraft concerned; and for the operations on board, the resolution of the conflict is implemented more rapidly and the workload of the crew is reduced.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A collision avoidance method for an aircraft formation, relative to at least one intrusive aircraft external to the aircraft formation, the aircraft formation comprising a lead aircraft and at least one following aircraft, the method comprising a formation flight management method implemented on all aircraft of the aircraft formation and comprising managing a formation flight thereof, the method comprising a first series of steps comprising:
  a first reception step implemented by a first data reception unit and comprising receiving, for at least one aircraft of the aircraft formation, information on risk of a collision with the intrusive aircraft;
  a first decision step implemented by a first decision unit and comprising:
    generating, using a processor, an avoidance decision upon the reception of collision risk information concerning at least one aircraft of the aircraft formation, the avoidance decision comprising a coordinated avoidance maneuver intended for all the aircraft of the aircraft formation, and
    implementing, using a processor, a predetermined avoidance logic;
  a first transmission step implemented by a first data transmission unit and comprising transmitting the avoidance decision to the aircraft of the aircraft formation; and
  executing the coordinated avoidance maneuver in at least one or more or all aircraft of the aircraft formation to avoid collision with the intrusive aircraft.

2. The method as claimed in claim 1, wherein the first series of steps is implemented on the lead aircraft.

3. The method as claimed in claim 1, wherein the information on the risk of collision with the intrusive aircraft is generated by a collision risk detection method implemented on at least one of the aircraft of the aircraft formation.

4. The method as claimed in claim 1, wherein the first decision unit generates the avoidance decision by taking account of data on the intrusive aircraft, on roles of the aircrafts in the formation.

5. The method as claimed in claim 1, wherein the first series of steps also comprises:

a second reception step, implemented by the first data reception unit and comprising receiving agreement/disagreement information from the at least one following aircraft; and a second transmission step implemented by the first data transmission unit and comprising, in case of reception of agreement information, transmitting a command to trigger the coordinated avoidance maneuver to the at least one following aircraft for it to implement this coordinated avoidance maneuver.

6. The method as claimed in claim 5, wherein the first series of steps comprises a first application step implemented by a first application unit and comprising applying to the lead aircraft a specific avoidance logic, in case of reception of disagreement information.

7. The method as claimed in claim 1, wherein the first transmission step comprises also transmitting a command to trigger the coordinated avoidance maneuver to the at least one following aircraft for it to implement the coordinated avoidance maneuver.

8. The method as claimed in claim 1, comprising a second series of steps, implemented on the at least one following aircraft of the aircraft formation and comprising:
   a third reception step implemented by a second data reception unit and comprising receiving the coordinated avoidance maneuver;
   a second decision step implemented by a second decision unit and comprising generating agreement/disagreement information concerning the coordinated avoidance maneuver; and
   a third transmission step implemented by a second data transmission unit and comprising transmitting the agreement/disagreement information to the lead aircraft.

9. The method as claimed in claim 8, wherein the second series of steps comprises, in case of generation of disagreement information, a second application step implemented by a second application unit and comprising applying to the following aircraft a specific avoidance logic.

10. The method as claimed in claim 8, wherein the second series of steps comprises, in case of generation of agreement information:
   a fourth reception step implemented by the second data reception unit and comprising receiving a command to activate a coordinated avoidance maneuver; and
   a third application step implemented by the second application unit and comprising applying the coordinated avoidance maneuver to the following aircraft.

11. The method as claimed in claim 8, for an aircraft formation comprising a plurality of following aircraft, wherein the second series of steps is implemented on each of the following aircraft of the aircraft formation.

12. A collision avoidance device for an aircraft formation, relative to at least one intrusive aircraft external to the aircraft formation, the aircraft formation comprising a lead aircraft and at least one following aircraft, the device comprising:
   a formation flight management unit with which all aircraft of the aircraft formation are equipped and configured to manage a formation flight thereof; and
   a management assembly comprising:
      a first data reception unit configured to receive, for at least one aircraft of the aircraft formation, information on a risk of a collision with the intrusive aircraft;
      a first decision unit comprising a processor configured to generate an avoidance decision upon the reception of collision risk information concerning at least one aircraft of the aircraft formation, the avoidance decision comprising a coordinated avoidance maneuver intended for all the aircraft of the aircraft formation, the coordinated avoidance maneuver being determined to avoid the collision with the intrusive aircraft while maintaining the formation flight when it is applied to all the aircraft of the aircraft formation, wherein the first decision unit is configured to implement a predetermined avoidance logic; and
      a first data transmission unit configured to transmit the avoidance decision comprising the coordinated avoidance maneuver to each aircraft of the aircraft formation.

13. The device as claimed in claim 12, wherein:
   the first data reception unit is configured to receive agreement/disagreement information from the at least one following aircraft; and
   the first data transmission unit is configured to, in case of reception of agreement information, transmit a command triggering the coordinated avoidance maneuver to the at least one following aircraft for it to implement this coordinated avoidance maneuver.

14. The device as claimed in claim 13, comprising at least one control assembly mounted on at least one of the following aircraft of the aircraft formation and comprising:
   a second data reception unit configured to receive the coordinated avoidance maneuver;
   a second decision unit configured to generate agreement/disagreement information concerning the coordinated avoidance maneuver; and
   a second data transmission unit configured to transmit the agreement/disagreement information to the lead aircraft.

15. The device as claimed in claim 12, comprising at least one control assembly mounted on at least one of the following aircraft of the aircraft formation and comprising:
   a second data reception unit configured to receive the coordinated avoidance maneuver;
   a second decision unit configured to generate agreement/disagreement information concerning the coordinated avoidance maneuver; and
   a second data transmission unit configured to transmit the agreement/disagreement information to the lead aircraft.

16. An anti-collision system for an aircraft, comprising:
   a transponder;
   at least one antenna;
   an alert unit;
   a display; and
   a collision avoidance device comprising:
   a formation flight management unit with which all aircraft of the aircraft formation are equipped and configured to manage a formation flight thereof; and
   a management assembly comprising:
      a first data reception unit configured to receive, for at least one aircraft of the aircraft formation, information on a risk of a collision with the intrusive aircraft;
      a first decision unit comprising a processor configured to generate an avoidance decision upon the reception of collision risk information concerning at least one aircraft of the aircraft formation, the avoidance decision comprising a coordinated avoidance maneuver intended for all the aircraft of the aircraft formation, the coordinated avoidance maneuver being determined to avoid the collision with the intrusive aircraft while maintaining the formation flight when it is applied to all the aircraft of the aircraft formation, wherein the first decision unit is configured to implement a predetermined avoidance logic; and a first data transmission unit configured to transmit the avoidance decision comprising the coordinated avoidance maneuver to each aircraft of the aircraft formation.

* * * * *